(12) United States Patent
Murata

(10) Patent No.: US 9,780,628 B2
(45) Date of Patent: Oct. 3, 2017

(54) GENERATOR INSPECTION METHOD

(71) Applicant: MITSUBISHI HITACHI POWER SYSTEMS, LTD., Kanagawa (JP)

(72) Inventor: Yuichi Murata, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 102 days.

(21) Appl. No.: 14/908,007

(22) PCT Filed: Sep. 4, 2014

(86) PCT No.: PCT/JP2014/073275
§ 371 (c)(1),
(2) Date: Jan. 27, 2016

(87) PCT Pub. No.: WO2015/064208
PCT Pub. Date: May 7, 2015

(65) Prior Publication Data
US 2016/0172944 A1 Jun. 16, 2016

(30) Foreign Application Priority Data

Oct. 30, 2013 (JP) ................................ 2013-225469

(51) Int. Cl.
*H02K 15/00* (2006.01)
*H02K 7/18* (2006.01)
*G01M 13/00* (2006.01)

(52) U.S. Cl.
CPC ............ *H02K 15/00* (2013.01); *G01M 13/00* (2013.01); *H02K 7/1815* (2013.01); *H02K 15/0006* (2013.01)

(58) Field of Classification Search
CPC .. H02K 15/00; H02K 15/0006; H02K 7/1815; G01M 13/00
See application file for complete search history.

(56) References Cited

U.S. PATENT DOCUMENTS 5,331,243 A * 7/1994 Halbohm ................ F16C 17/20
  29/426.5
7,281,308 B2   10/2007 Ashar et al.
(Continued)

FOREIGN PATENT DOCUMENTS

| JP | 54-48901 | 4/1979 |
|----|----------|--------|
| JP | 59-97585 | 7/1984 |

(Continued)

OTHER PUBLICATIONS

International Search Report dated Dec. 16, 2014 in corresponding International Application No. PCT/JP2014/073275.
(Continued)

*Primary Examiner* — Ryan Walsh
(74) *Attorney, Agent, or Firm* — Wenderoth, Lind & Ponack, L.L.P.

(57) ABSTRACT

In the present invention, the following are carried out: a shaft disconnecting step of disconnecting rotary machines that are respectively connected to both ends of a shaft of a generator; a gap forming step of forming a gap in a vertical direction between the generator and an installation stand; a pathway installing step of inserting into the gap a portion of a movement pathway member extending in a lateral direction which includes a horizontal direction component and a radial direction component of the shaft; a moving step of moving the generator in the lateral direction on the movement pathway member; and an inspecting step of inspecting the generator having undergone the moving step.

11 Claims, 22 Drawing Sheets

(56) References Cited

U.S. PATENT DOCUMENTS

| | | | | | |
|---|---|---|---|---|---|
| 2009/0025466 | A1* | 1/2009 | Moritani | ............... | G01M 15/02 |
| | | | | | 73/114.01 |
| 2009/0255104 | A1* | 10/2009 | Gillivan | ............... | F01D 25/285 |
| | | | | | 29/426.1 |
| 2010/0154201 | A1* | 6/2010 | Pervaiz | .............. | H02K 15/0006 |
| | | | | | 29/598 |
| 2011/0162194 | A1* | 7/2011 | Sugimoto | ................. | B66C 9/02 |
| | | | | | 29/592.1 |
| 2014/0230235 | A1* | 8/2014 | Allen | ................ | H02K 15/0006 |
| | | | | | 29/596 |

FOREIGN PATENT DOCUMENTS

| | | |
|---|---|---|
| JP | 62-243903 | 10/1987 |
| JP | 6-2969 | 1/1994 |
| JP | 8-68303 | 3/1996 |
| JP | 2004-72891 | 3/2004 |

OTHER PUBLICATIONS

Written Opinion of the International Searching Authority dated Dec. 16, 2014 in corresponding International Application No. PCT/JP2014/073275.

* cited by examiner

GENERATOR INSPECTION METHOD

TECHNICAL FIELD

The present invention relates to an inspection method of a generator in which rotary machines are respectively connected to both ends of a shaft. This application claims priority to Japanese Patent Application No. 2013-225469 filed in Japan on Oct. 30, 2013, the contents of which are incorporated herein by reference.

BACKGROUND ART

As one type of combined cycle power generation plant that drives a generator using a gas turbine and a steam turbine, there is a power generation plant in which a shaft of the gas turbine is connected to one end of a shaft of the generator and a shaft of the steam turbine is connected to the other end of the shaft of the generator. In this type of the combined cycle power generation plant, the shaft of the gas turbine, the shaft of the generator, and the shaft of the steam turbine are aligned in the same straight line.

In this type of the combined cycle power generation plant, when an inspection of the shaft and the like is carried out after taking out the shaft of the generator from a casing of the generator, the inspection is sometimes carried out using the following method, for example. First, one of the gas turbine and the steam turbine that exist in an axial direction of the generator is disassembled. Next, after lifting up the generator, the shaft of the generator is pulled out from the casing of the generator toward a side, in the axial direction of the generator, on which an empty space has been created as a result of the disassembly. After that, the shaft is placed in a predetermined location, and the inspection of the shaft and the like is carried out.

In the above-described method, when disassembling the generator, it becomes necessary to disassemble the gas turbine or the steam turbine. Thus, with the above-described method, even when only the generator needs inspection, it is necessary to disassemble the gas turbine or the steam turbine.

Here, Patent Literature 1 described below discloses the following method in which it is not necessary to disassemble the gas turbine or the steam turbine when disassembling the generator. In this method, two platforms are prepared in advance, each of which has a floor face at a position higher than the highest point of the steam turbine. Then, of the two platforms, the first platform is installed so that the floor face of the first platform is positioned above the steam turbine. Next, the shaft of the generator is disconnected from the shaft of the gas turbine, and at the same time, the shaft of the generator is disconnected from the shaft of the steam turbine. Next, the generator is lifted up using a special lift-up device, until a bottom of the generator reaches a higher position than the floor face of the first platform. Next, the second platform is installed below the generator, and the generator is placed on the second platform. Next, the shaft of the generator is pulled out from the generator placed on the second platform toward the first platform side in the axial direction of the shaft. After that, the shaft is placed on the first platform, and the inspection of the shaft and the like is carried out.

CITATION LIST

Patent Literature

Patent Literature 1: Japanese Unexamined Patent Application Publication No. 2004-072891A

SUMMARY OF INVENTION

Technical Problem

In the above-described method disclosed in Patent Literature 1, in order to inspect the generator, it is necessary to prepare two large platforms. As a result, a problem arises in that inspection costs of the generator become expensive.

In light of the foregoing, an object of the present invention is to provide a generator inspection method that can minimize inspection costs of a generator.

Solution to Problem

A generator inspection method, which is one aspect of the invention for achieving the above-described object, is a method of inspecting a generator in which rotary machines are respectively connected to both ends of a shaft, the method comprising: a shaft disconnecting step of disconnecting the rotary machines respectively connected to the ends of the shaft; a gap forming step of forming a gap in a vertical direction between an installation stand of the generator and the generator; a pathway installing step of inserting into the gap a portion of a movement pathway member extending in a lateral direction, the lateral direction including a horizontal direction component and a radial direction component of the shaft; a moving step of moving the generator in the lateral direction on the movement pathway member; and an inspecting step of inspecting the generator having undergone the moving step.

In the generator inspection method, an inspection of the generator is carried out after the generator has been moved in the lateral direction. Thus, it is not necessary to disassemble the rotary machines to inspect the generator. Further, in the inspection method, the generator is moved in the lateral direction. Thus, although the movement pathway member is needed for the movement, it is not necessary to prepare two large platforms. As a result, it is possible to minimize inspection costs.

Here, in the generator inspection method, following the gap forming step and before the moving step, a roller arranging step may be carried out to arrange a roller, which rolls in the lateral direction, between the movement pathway member and the generator.

In this generator inspection method, the generator is moved by causing the roller to roll under the generator. Thus, it is possible to move the generator easily.

Further, in the generator inspection method in which the roller arranging step is carried out, in the roller arranging step, a roller carriage may be arranged, the roller carriage being provided with at least one roller and a base which has a placement portion, on which an object is placed, above the at least one roller and which rotatably supports the at least one roller.

In this generator inspection method, the at least one roller can be handled integrally. Thus, when the roller is arranged and the generator is moved, it is possible to move the roller easily.

Further, in one of the generator inspection methods in which the roller arranging step is carried out, the movement pathway member may have a roller guide member that regulates a movement of the roller in a horizontal direction perpendicular to the lateral direction.

Further, in one of the generator inspection methods in which the roller arranging step is carried out, in the moving step, a rolling of the roller may be restricted after the generator is moved to an intended position in the lateral direction.

In this generator inspection method, it is possible to carry out an inspection of the generator that is in a stable state.

In one of the above-described generator inspection methods, in the gap forming step, the generator may be lifted upward using a jack, and a gap may be formed in the vertical direction between the installation stand of the generator and the generator.

In one of the above-described generator inspection methods, a structure that supports the movement pathway member may be installed in advance at a position in the lateral direction of the generator, and in the pathway installing step, the portion of the movement pathway member may be inserted into the gap and then the movement pathway member may be placed on the installation stand and the structure.

In this case, the structure may have a floor board and a support structure that supports the floor board from below, and a portion of the floor board may be cut out along a section on which the movement pathway member is placed above the support structure.

In this generator inspection method, the movement pathway member is installed on the support structure of a work stand, the support structure being exposed from a cutout of the floor board of the work stand. Thus, in the inspection method, it is possible to easily identify an installation location of the movement pathway member, and also, as the movement pathway member is supported by the support structure having a high rigidity, the movement pathway member can be supported in a stable manner.

Further, in this case, the structure may have a lid board that closes the cutout section of the floor board.

In one of the above-described generator inspection methods, in the inspecting step, the shaft may be pulled out in an axial direction from a casing that covers the shaft.

In one of the above-described generator inspection methods, after the inspecting step, the following may be carried out: a return moving step of returning the generator to an original position thereof above the installation stand in the horizontal direction by moving the generator on the movement pathway member in the lateral direction; a gap forming step of forming a gap in the vertical direction between the movement pathway member and the generator; a pathway removing step of removing the movement pathway member; a placing step of placing the generator on the installation stand; and a shaft connecting step of connecting the rotary machines respectively to the ends of the shaft.

Advantageous Effects of Invention

According to one aspect of the present invention, inspection costs of a generator can be minimized.

DESCRIPTION OF EMBODIMENTS

An embodiment of a generator inspection method according to the present invention will be described below with reference to FIGS. 1 to 22.

Figure 22:
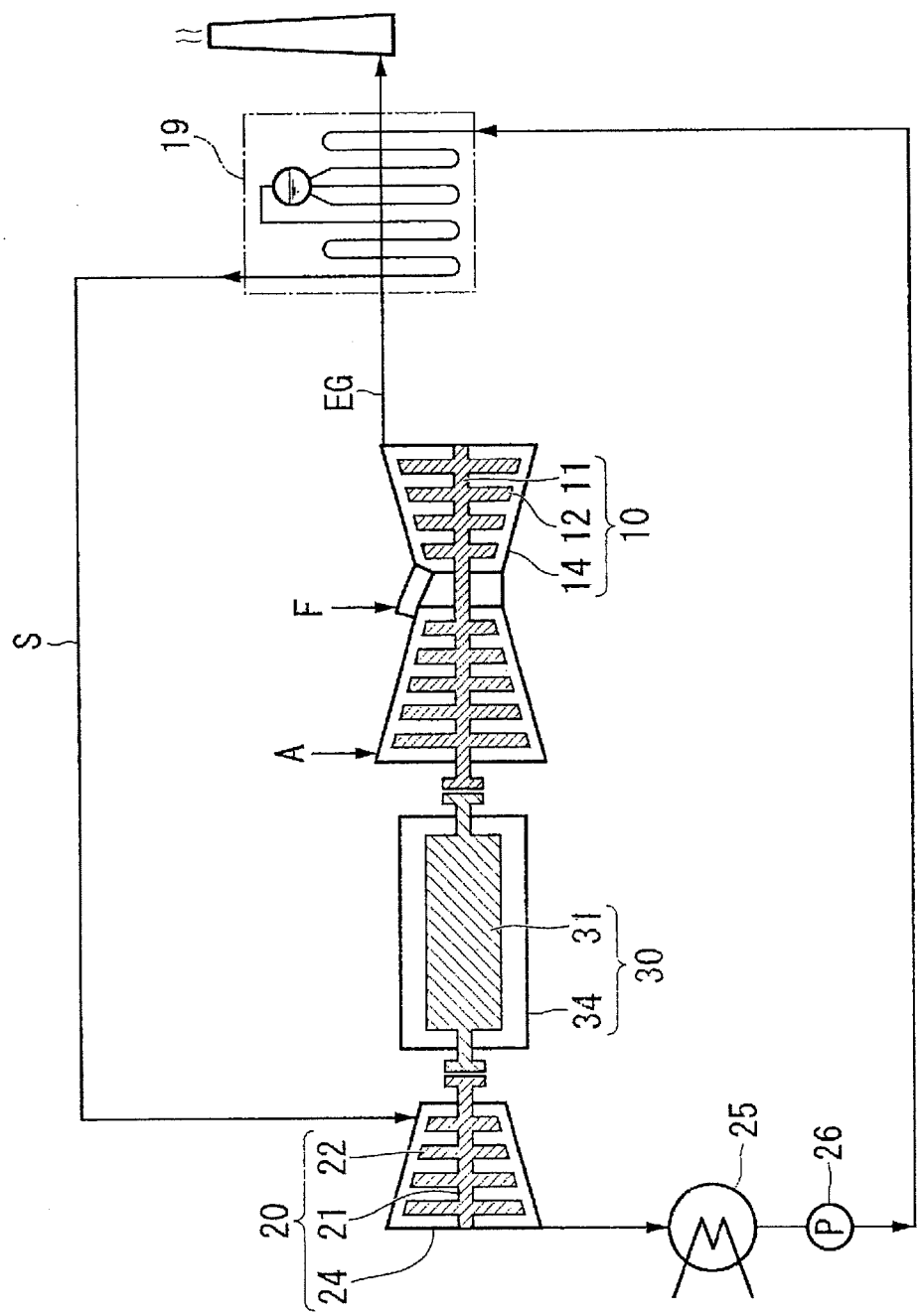
FIG. 22 is a system diagram of the combined cycle power generation plant of the embodiment according to the present invention.

First, a plant provided with a generator to be inspected will be described. As illustrated in FIG. 22, this plant is a combined cycle power generation plant that drives a generator 30 using a gas turbine 10 and a steam turbine 20.

This combined cycle power generation plant is provided with the above-mentioned gas turbine 10, an exhaust heat recovery boiler 19 that generates steam S using an exhaust gas EG from the gas turbine 10, the above-mentioned steam turbine 20 that is driven by the steam S generated by the exhaust heat recovery boiler 19, the above-mentioned generator 30 that generates power using the drive power of the gas turbine 10 and the steam turbine 20, a condenser 25 that turns the steam S, which has driven the steam turbine 20, back into water, and a pump 26 that transfers the water in the condenser 25 back to the exhaust heat recovery boiler 19.

Figure 2:
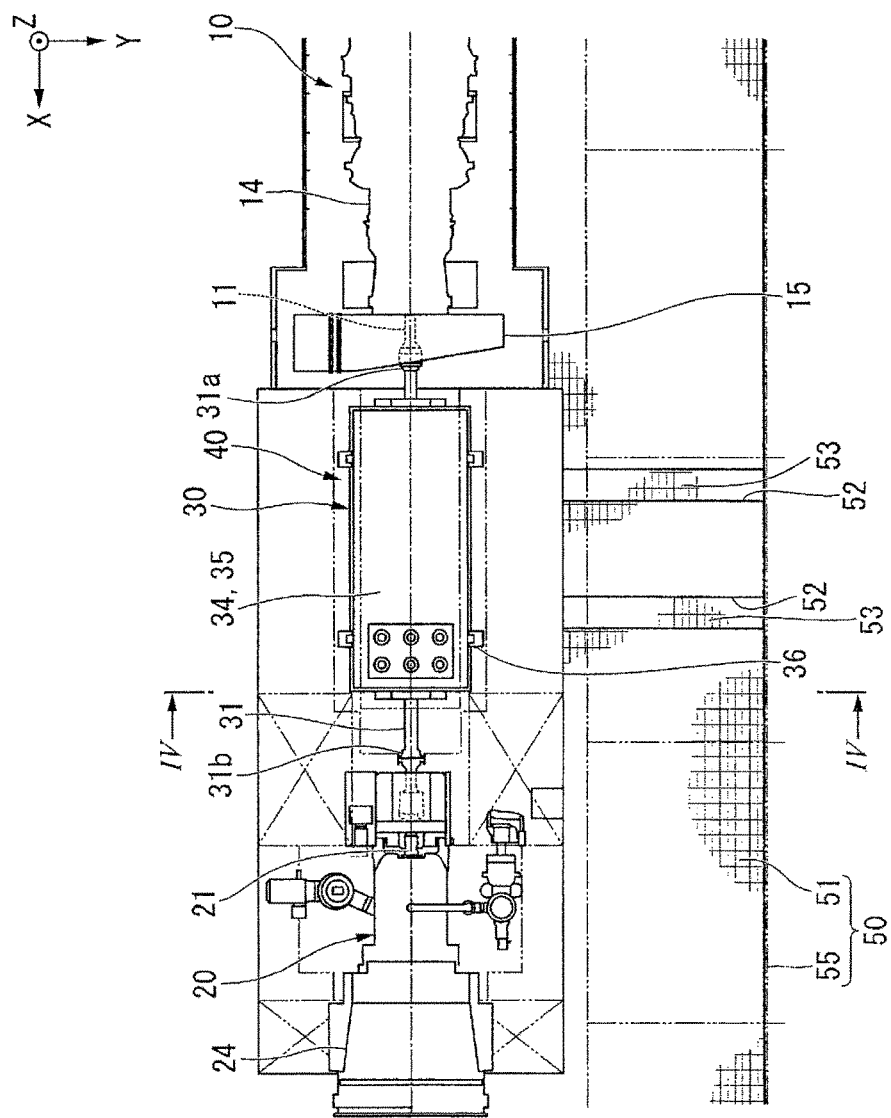
FIG. 2 is a plan view of a main portion of a combined cycle power generation plant of the embodiment according to the present invention.
Figure 3:
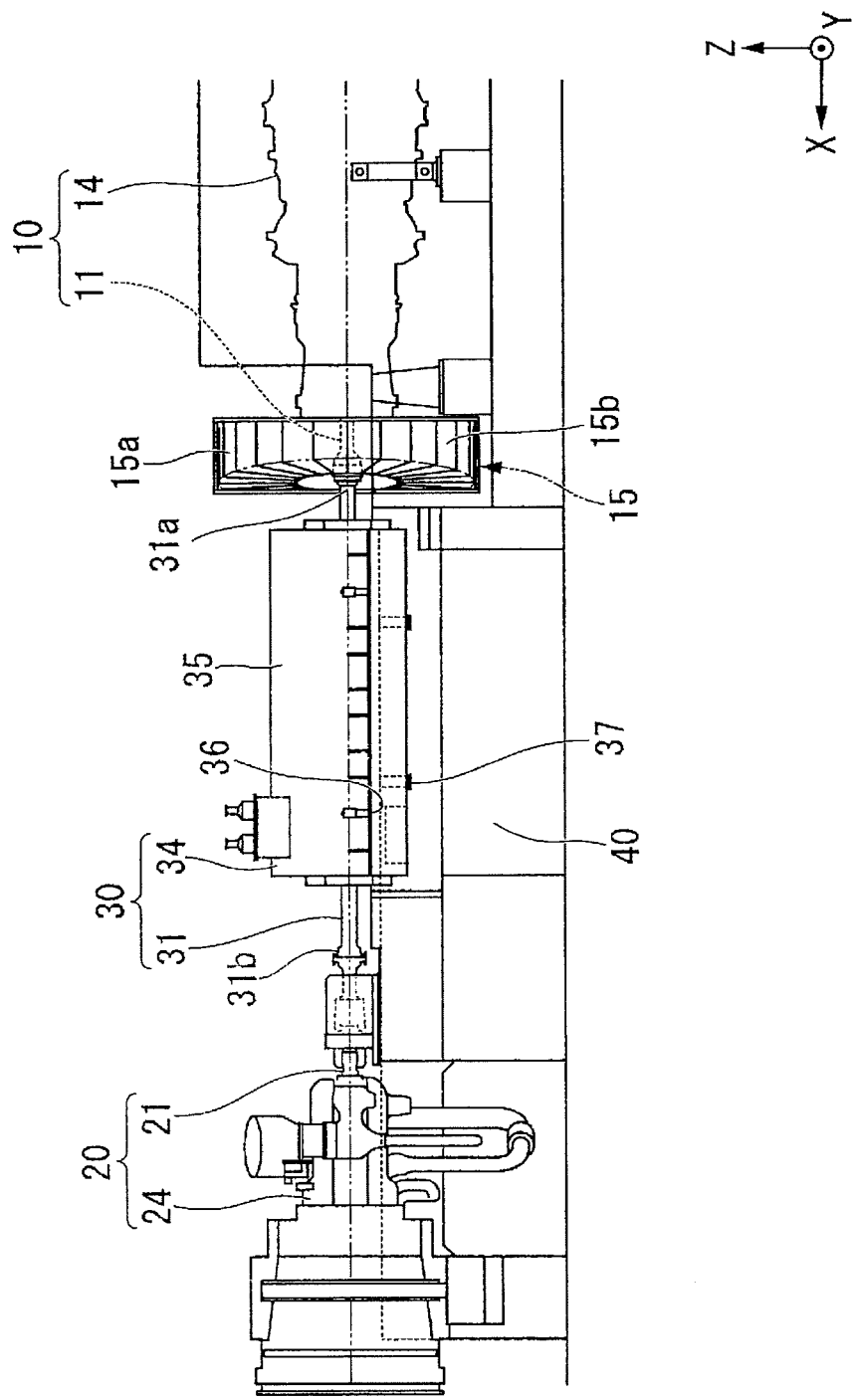
FIG. 3 is a side view of the main portion of the combined cycle power generation plant of the embodiment according to the present invention.

The gas turbine 10 and the steam turbine 20 respectively have shafts 11 and 21, which are respectively provided with a plurality of blades 12 and 22 on the outer circumference thereof, and casings 14 and 24 that rotatably cover the shafts 11 and 21. Further, the generator 30 also has a shaft 31 and a casing 34 that rotatably covers the shaft 31. As illustrated in FIG. 2 and FIG. 3, the casing 34 of the generator 30 has a cylindrical casing main body 35, and a first load receiving seat 36 and a second load receiving seat 37 that protrude toward an outer circumferential side from the casing main body 35. The shaft 11 of the gas turbine (a rotary machine) 10 is connected to one end 31a of the shaft 31 of the generator 30, and the shaft 21 of the steam turbine (a rotary machine) 20 is connected to another end 31b of the shaft 31. The shaft 11 of the gas turbine 10, the shaft 31 of the generator 30, and the shaft 21 of the steam turbine 20 are aligned in the same straight line, in that order.

Figure 4:
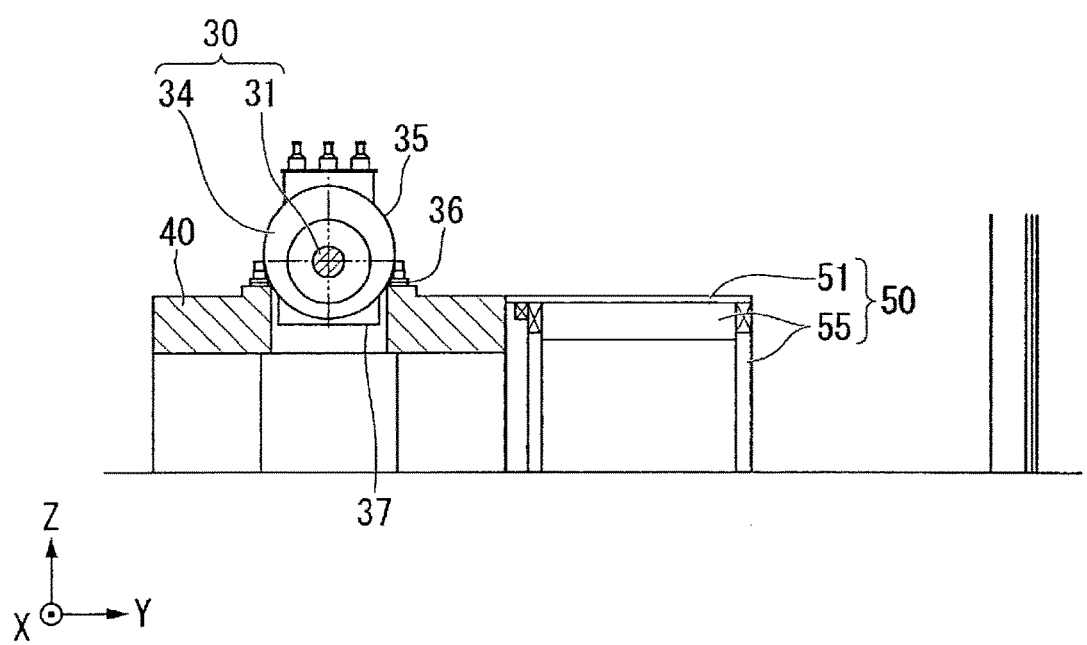
FIG. 4 is a cross-sectional view taken along a line IV-IV in FIG. 2.

As illustrated in FIGS. 2 to 4, each of the gas turbine 10, the generator 30, and the steam turbine 20 is installed on an installation stand 40 made of reinforced concrete, for example. Here, a direction which is a horizontal direction and in which the shaft 31 of the gas turbine 10, the generator 30, and the steam turbine 20 extends is defined as an X-direction, a direction that is a horizontal direction perpendicular to the X-direction is defined as a Y-direction, and a direction that is perpendicular to the X-direction and the Y-direction is defined as a Z-direction. Note that in the description below, the X-direction may also be referred to as an axial direction, the Y-direction as a lateral direction, and the Z-direction as a vertical direction.

On a (+) Y side of each of the installation stands 40, a work stand 50 is provided as a structure extending in the X-direction. The work stand 50 has a floor board 51 formed by a grating or the like and a support structure 55 that supports the floor board 51 from below. The support structure 55 is configured by combining molded steel and the like. Of the floor board 51, two sections are cut out in a portion on the (+) Y side of the generator 30. Each of cutouts 52 extends in the Y-direction. A lid board 53 that closes an opening of the cutout 52 is provided for each of the cutouts 52 of the floor board 51. The lid board 53 extends in the Y-direction correspondingly to a shape of the cutout 52 and is formed by grating or the like in the same manner as the floor board 51.

Figure 1:
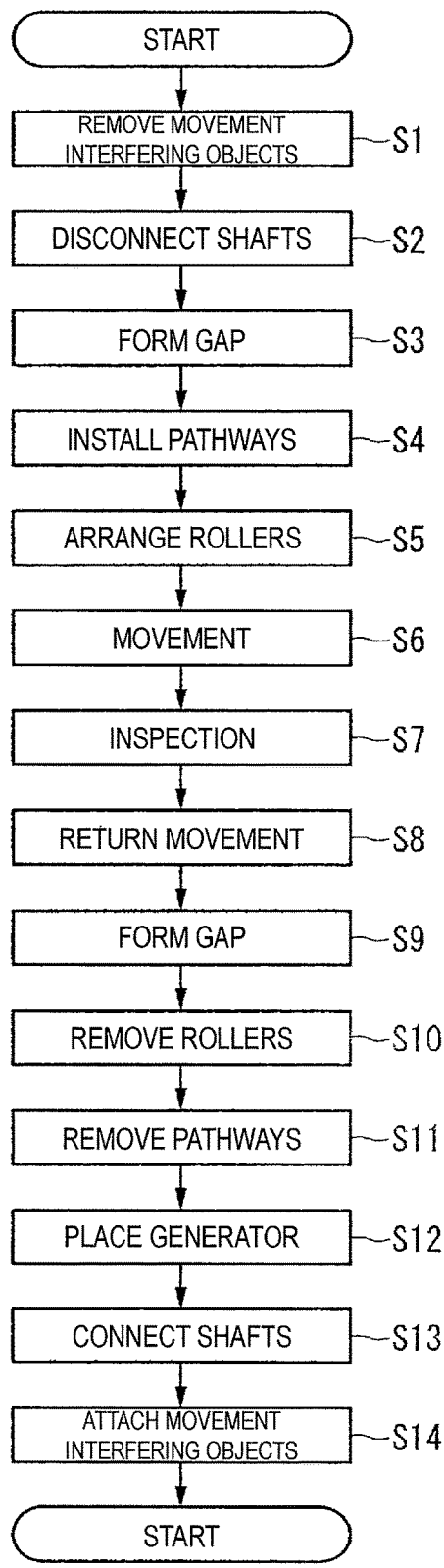
FIG. 1 is a flow chart illustrating a procedure of a generator inspection method of an embodiment according to the present invention.

Next, an inspection method of the generator 30 will be described in accordance with a flow chart illustrated in FIG. 1.

Figure 5:
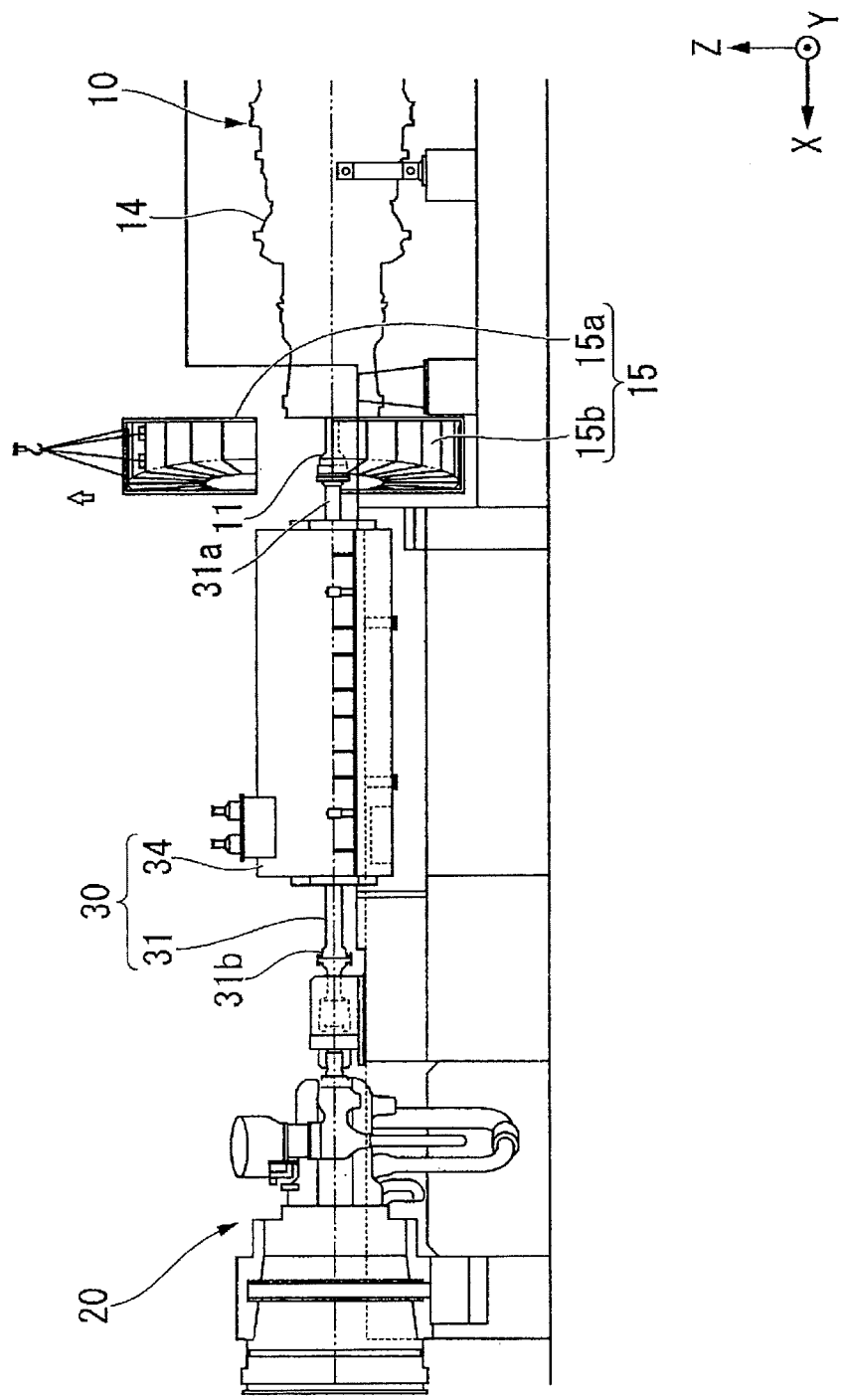
FIG. 5 is a side view of the main portion of the combined cycle power generation plant during a movement interfering object removing step of the embodiment according to the present invention.

First, to move the generator 30 in the vertical direction (the Z-direction) and the lateral direction (the Y-direction), an operator removes movement interfering objects that interfere with the movement of the generator 30 (step S1: a movement interfering object removing step). The movement interfering objects include various members existing in or around a connecting portion between the shaft 11 of the gas turbine 10 and the shaft 31 of the generator 30, various members existing in or around a connecting portion between the shaft 31 of the generator 30 and the shaft 21 of the steam turbine 20, and the like. For example, as illustrated in FIG. 5, a portion of the casing 14 of the gas turbine 10, which exists around the connecting portion between the shaft 11 of the gas turbine 10 and the shaft 31 of the generator 30, is removed. Specifically, this portion of the casing 14 is a manifold upper half portion 15a, of the manifold upper half portion 15a and a manifold lower half portion 15b of an intake manifold 15.

Next, the operator disconnects the shaft 11 of the gas turbine 10 from the shaft 31 of the generator 30 and also disconnects the shaft 31 of the generator 30 from the shaft 21 of the steam turbine 20 (step S2: a shaft disconnecting step). In the shaft disconnecting step (step S2), connection bolts or the like of coupling portions that connect the shafts with each other are removed, for example.

Figure 6:
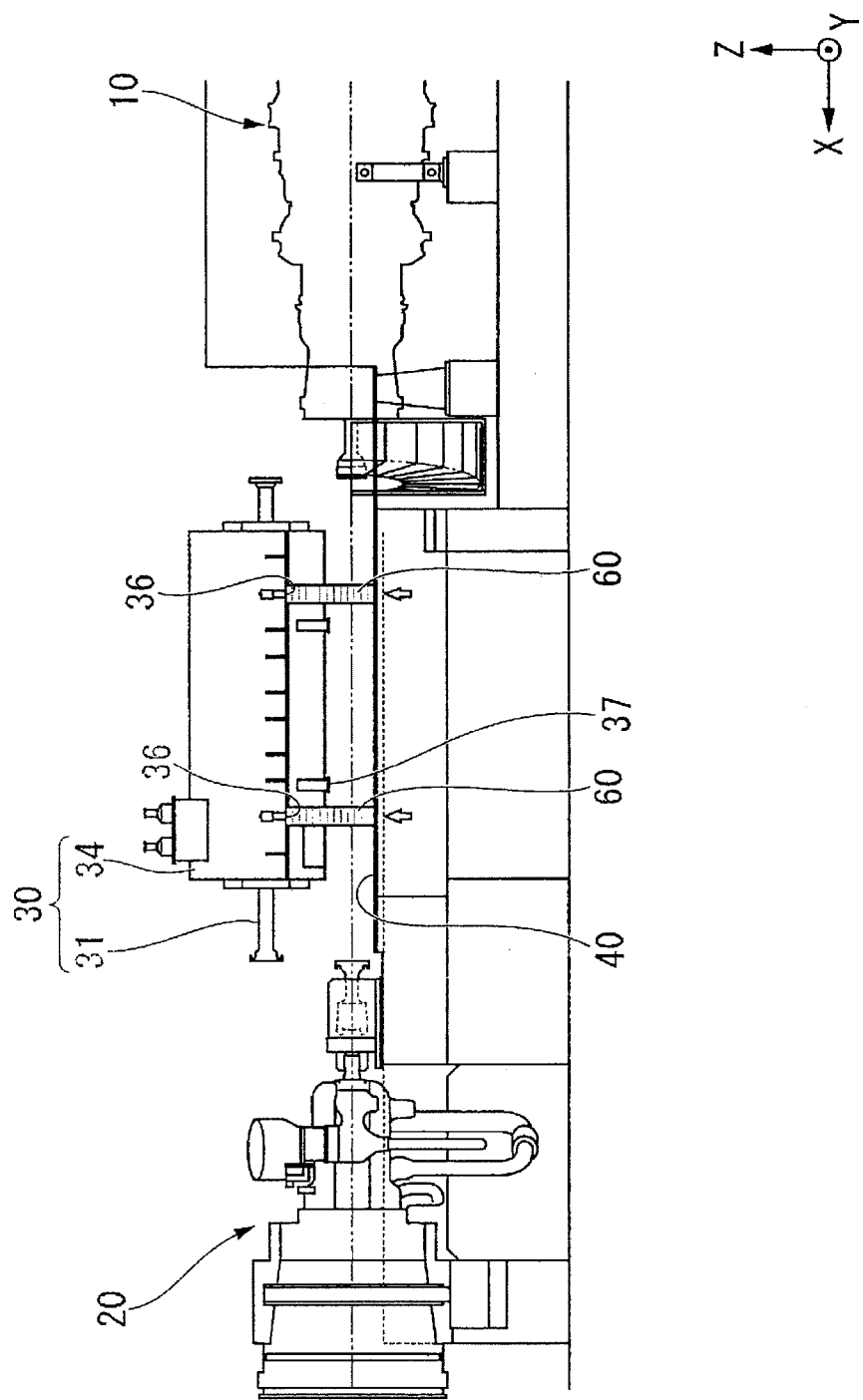
FIG. 6 is a side view of the main portion of the combined cycle power generation plant during a gap forming step of the embodiment according to the present invention.

Next, the operator forms a gap between the installation stand 40 and the generator 30 in the vertical direction (the Z-direction) (step S3: a gap forming step). In the gap forming step (step S3), the operator firstly removes installation bolts or the like that fix the generator 30 to the installation stand 40. Next, as illustrated in FIG. 6, the operator sets a jack 60 between the first load receiving seat 36 of the generator 30 and the installation stand 40, and lifts up the generator 30 by operating the jack 60 so as to form the gap between the generator 30 and the installation stand 40.

Figure 7:
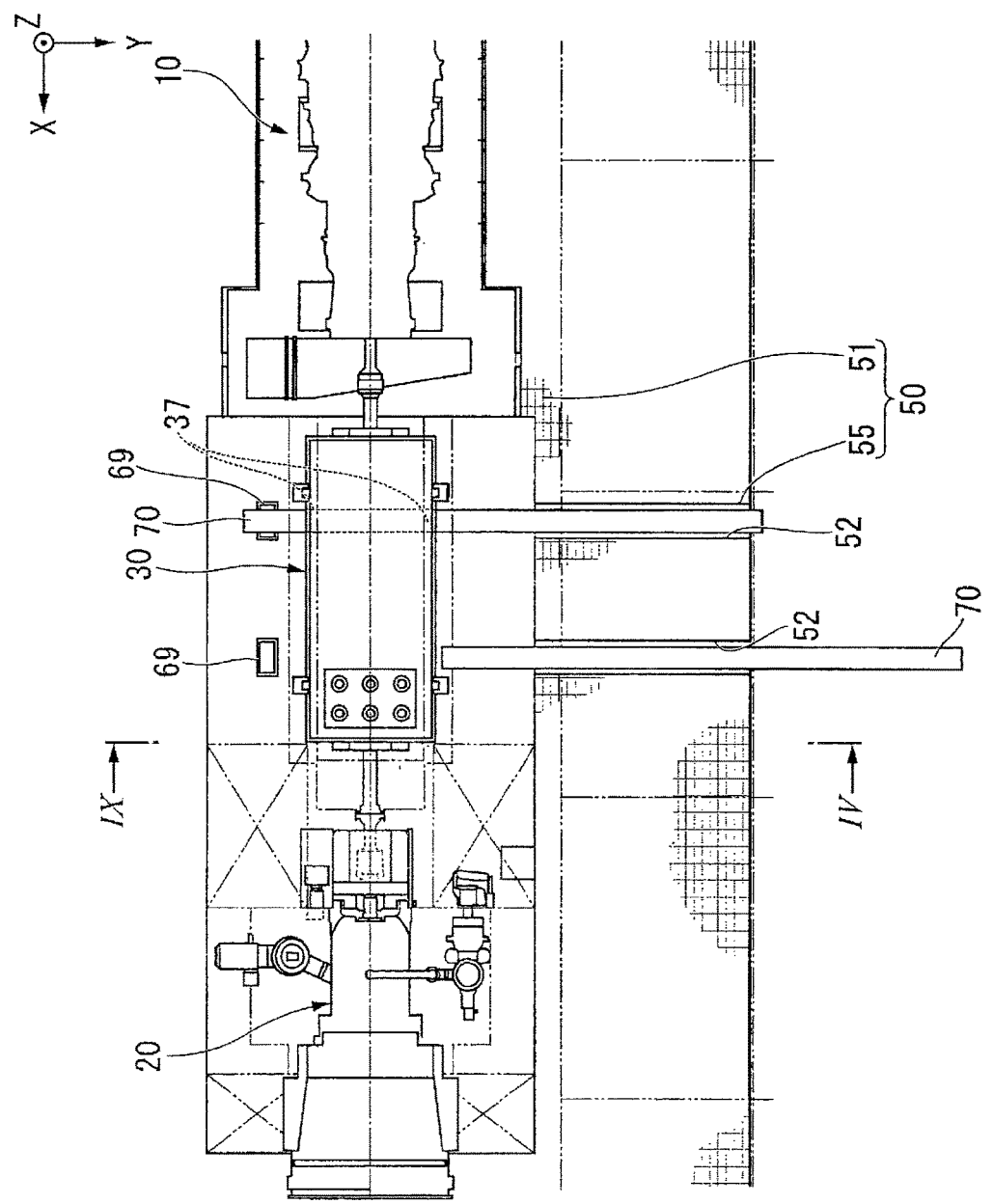
FIG. 7 is a plan view of the main portion of the combined cycle power generation plant during a pathway installing step of the embodiment according to the present invention.
Figure 8:
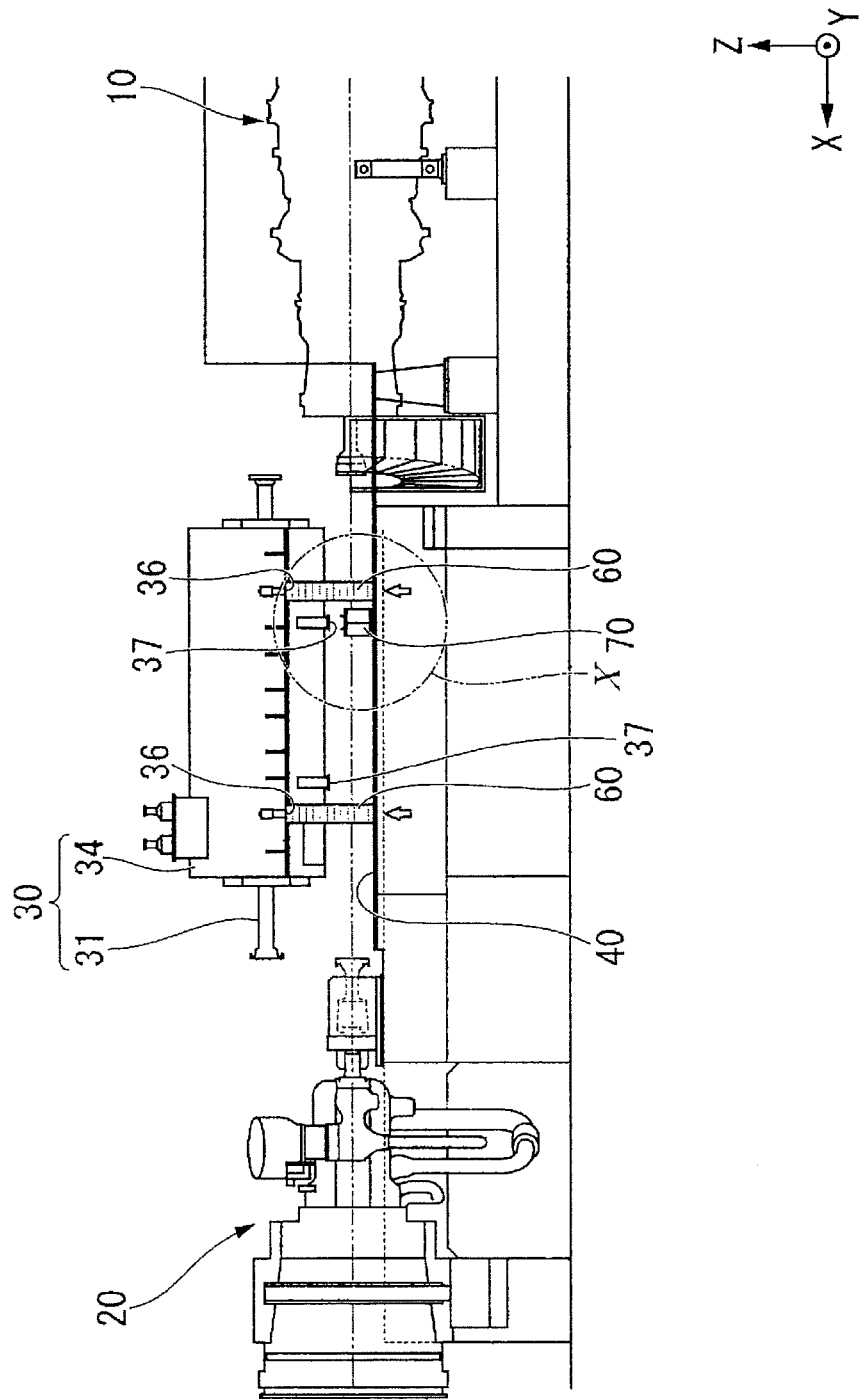
FIG. 8 is a side view of the main portion of the combined cycle power generation plant during the pathway installing step of the embodiment according to the present invention.
Figure 9:
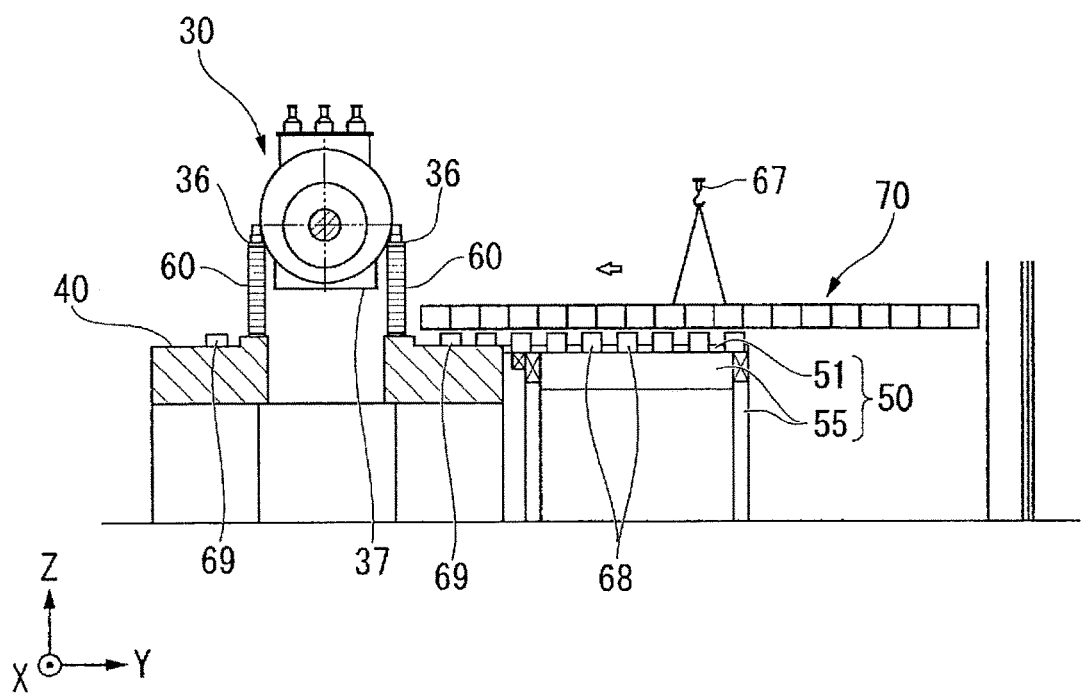
FIG. 9 is a cross-sectional view taken along a line IX-IX in FIG. 7.

Having jacked up the generator 30, as illustrated in FIGS. 7 to 9, the operator installs movement pathway members 70 in the gap between the second load receiving seat 37 (illustrated in FIG. 8) of the generator 30 and the installation stand 40 while aligning a longitudinal direction of the movement pathway members 70 with the lateral direction (the Y-direction) (step S4: a pathway installing step). In the pathway installing step (step S4), the operator firstly removes the lid boards 53 (illustrated in FIG. 2) from the work stand 50, and exposes a portion of the support structure 55. The portion of the work stand 50 from which the support structure 55 is exposed is an installation area of the movement pathway members 70 that extend in the lateral direction from the second load receiving seat 37 of the generator 30. Then, the operator arranges a plurality of level adjustment members 68 and 69 in the portion of the work stand 50 from which the support structure 55 is exposed, and in the installation area of the movement pathway members 70, which is part of the installation stand 40 of the generator 30. When the plurality of level adjustment members 68 and 69 are arranged in the installation area of the movement pathway members 70 on the work stand 50 and the installation stand 40, positions of upper surfaces of the plurality of level adjustment members 68 and 69 are aligned with each other in the vertical direction. Next, after lifting up the movement pathway members 70 using a crane 67 or the like, the movement pathway members 70 are moved to above the installation area thereof, and the movement pathway members 70 are further moved toward a (−) Y-direction side along the installation area. Then, after inserting a portion of each of the movement pathway members 70 under the generator 30, the movement pathway members 70 are placed on the level adjustment members 68 and 69 positioned on the installation area of the movement pathway members 70.

Here, the movement pathway member 70 will be described.

Figure 10:
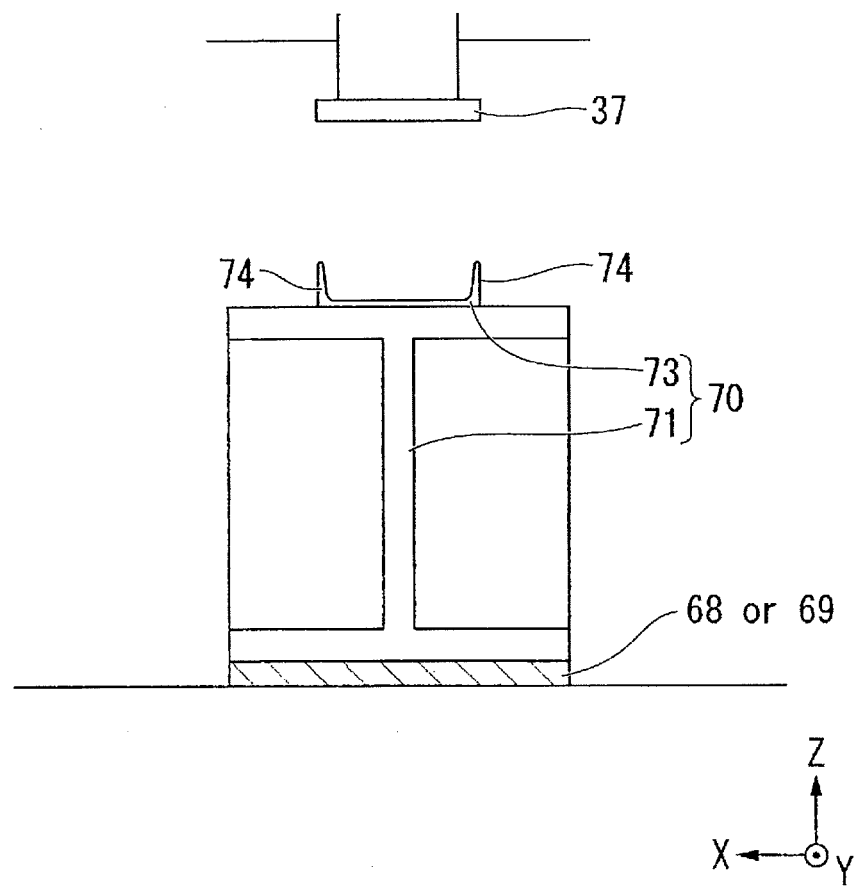
FIG. 10 is a detailed view of a section X in FIG. 8.
Figure 13:
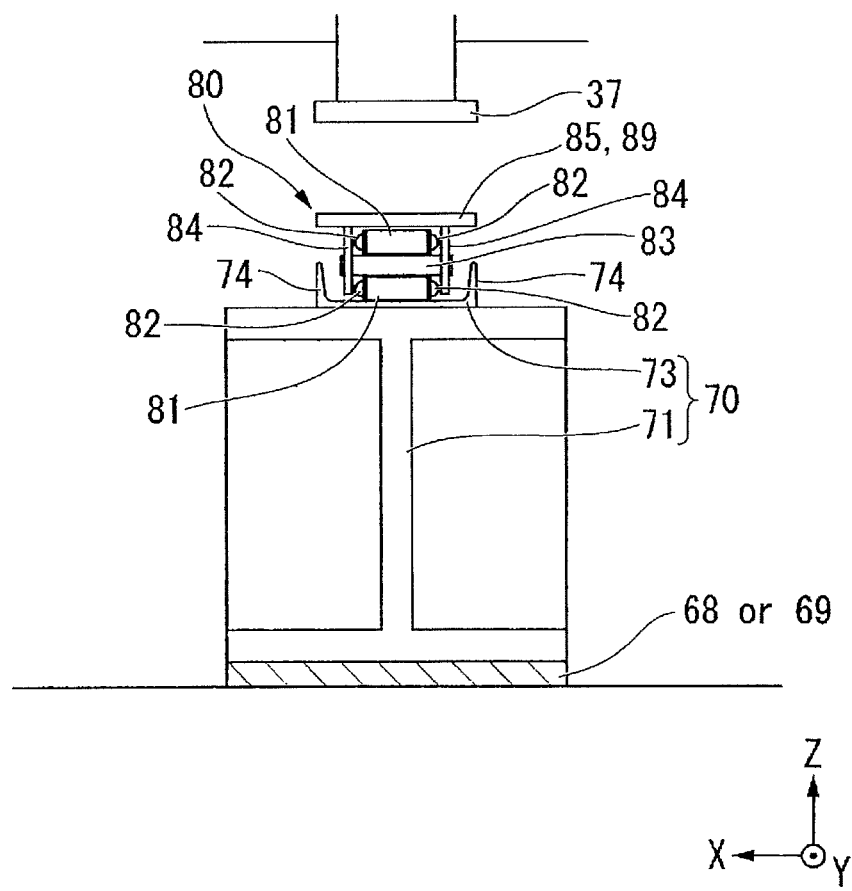
FIG. 13 is a detailed view of a section XIII in FIG. 12.

As illustrated in FIG. 10 and FIG. 13, the movement pathway member 70 has a roller guide rail (a roller guide member) 73 that regulates a movement of a roller carriage 80 in the horizontal direction (the X-direction) perpendicular to the lateral direction (the Y-direction), and a support beam 71 that supports the roller guide rail 73 and also receives a load of the generator 30. Here, channel steel is used as the roller guide rail 73. This channel steel is fixed on the support beam 71 with an opening of the channel steel facing upward. A pair of flange portions 74 of the channel steel, which face each other, regulate the movement of the roller carriage 80 in the X-direction. Here, H-shaped steel is used as the support beam 71. Note that the support beam 71 is not limited to the H-shaped steel and may be anything as long as a degree of distortion is equal to or less than a permissible value when the load of the generator 30 is received thereby.

Figure 11:
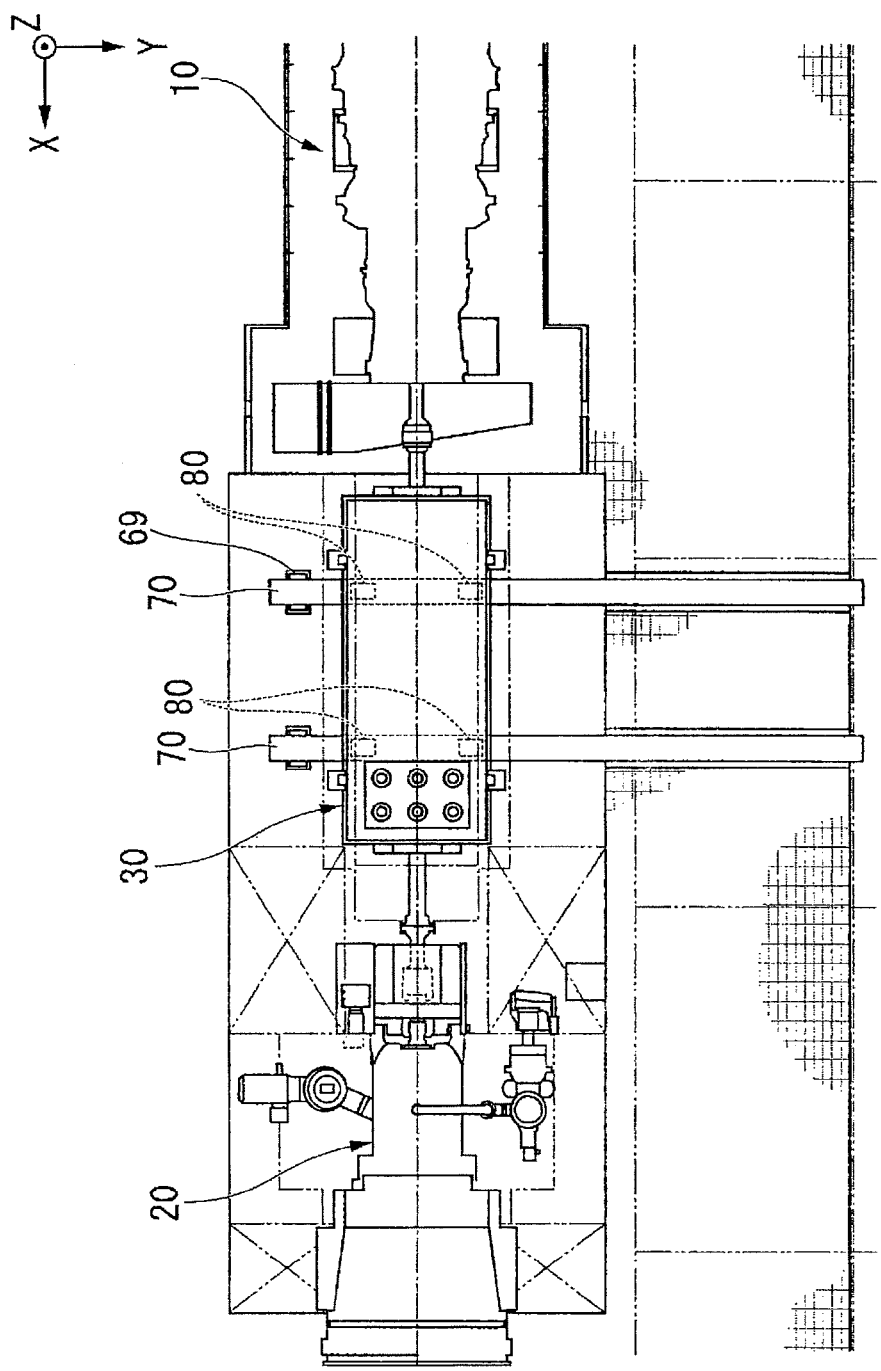
FIG. 11 is a plan view of the main portion of the combined cycle power generation plant during a roller arranging step of the embodiment according to the present invention.
Figure 12:
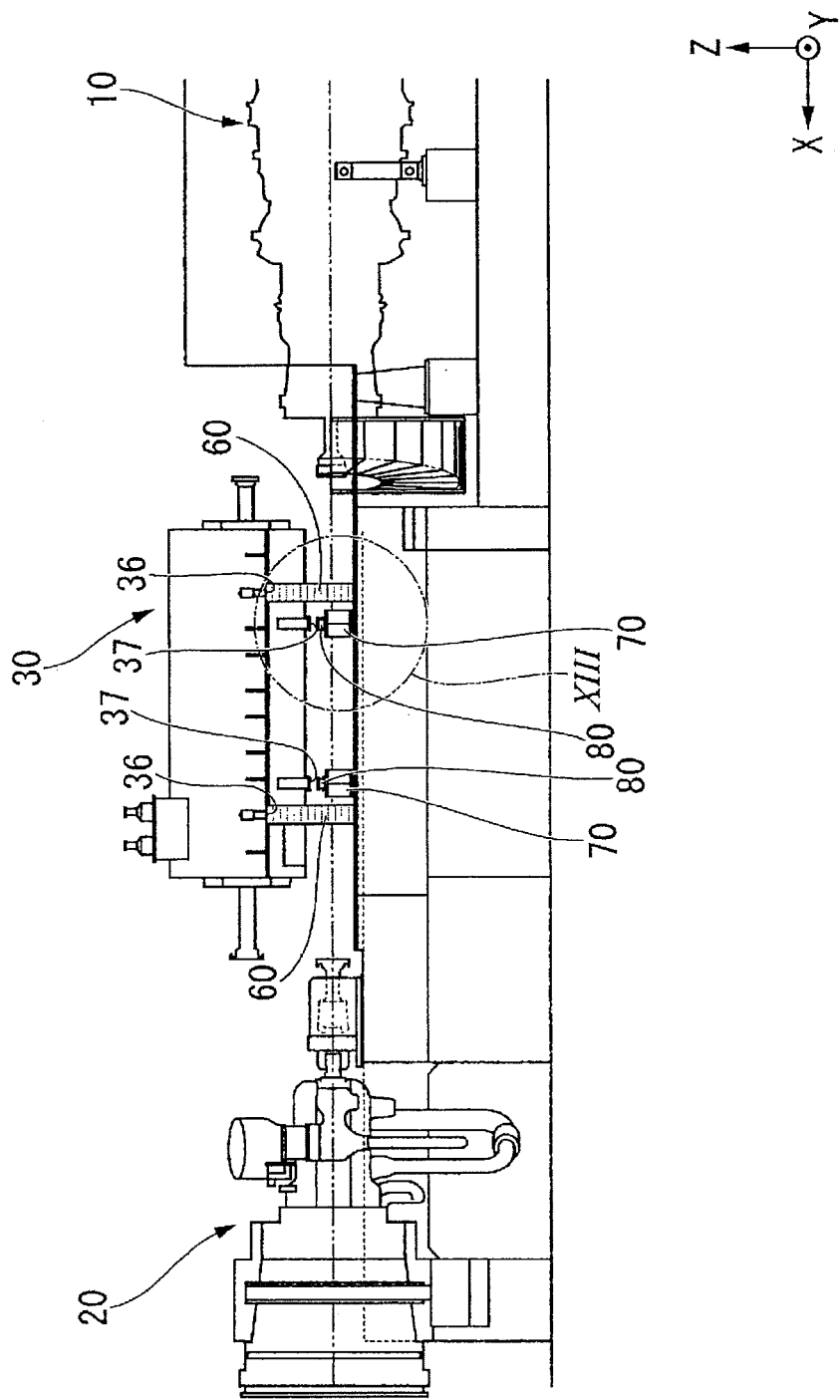
FIG. 12 is a side view of the main portion of the combined cycle power generation plant during the roller arranging step of the embodiment according to the present invention.
Figure 14:
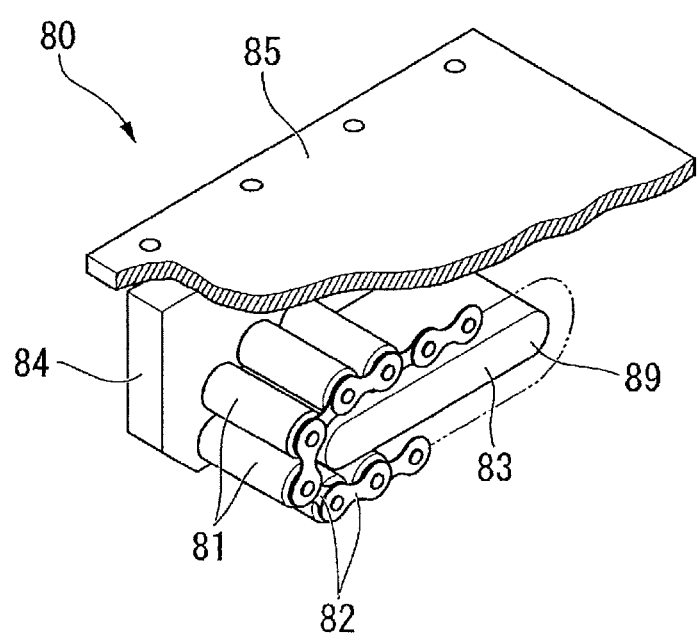
FIG. 14 is a cut-away perspective view of a main portion of a roller carriage of the embodiment according to the present invention.
Figure 15:
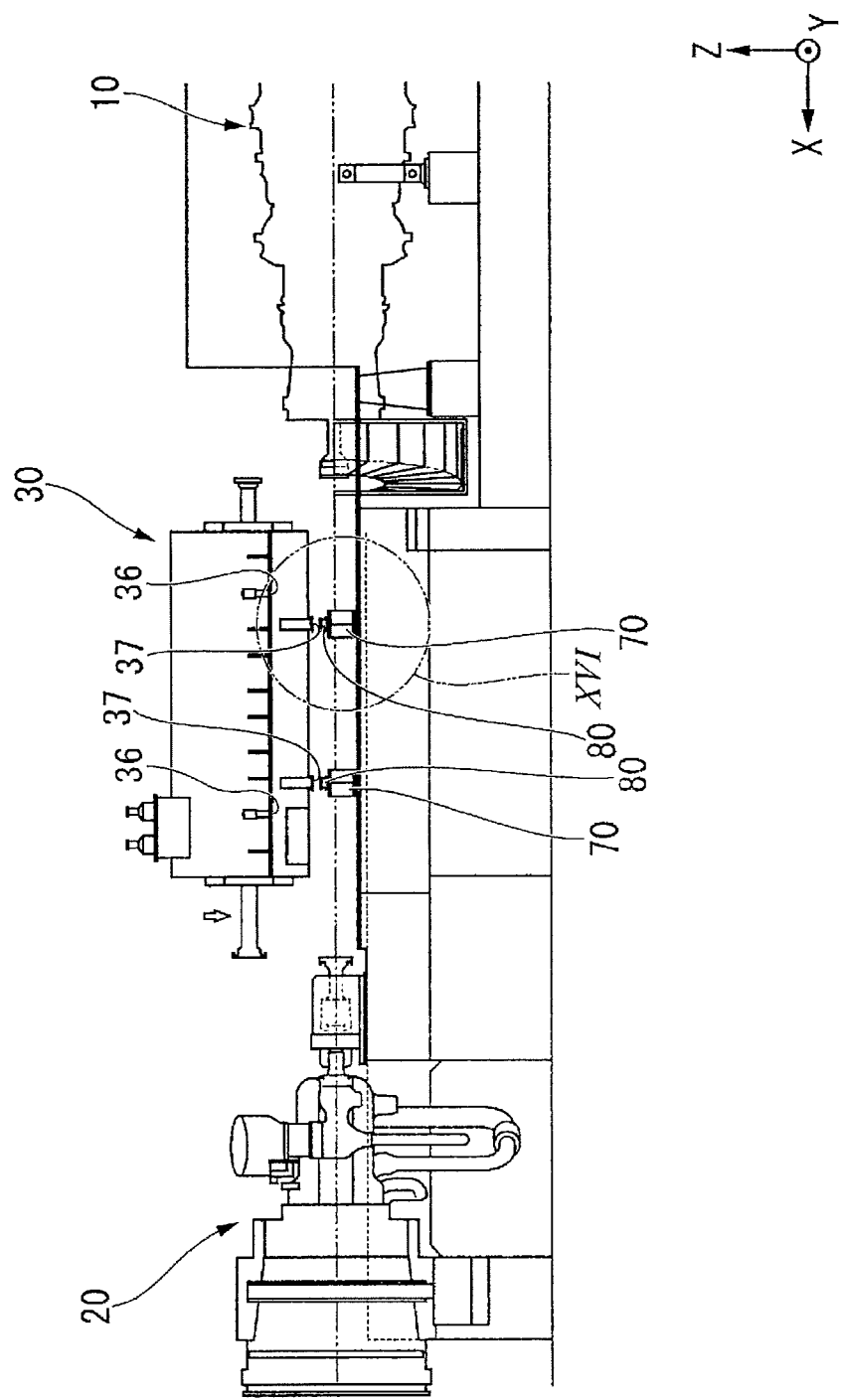
FIG. 15 is a side view of the main portion of the combined cycle power generation plant during a moving step of the embodiment according to the present invention.
Figure 16:
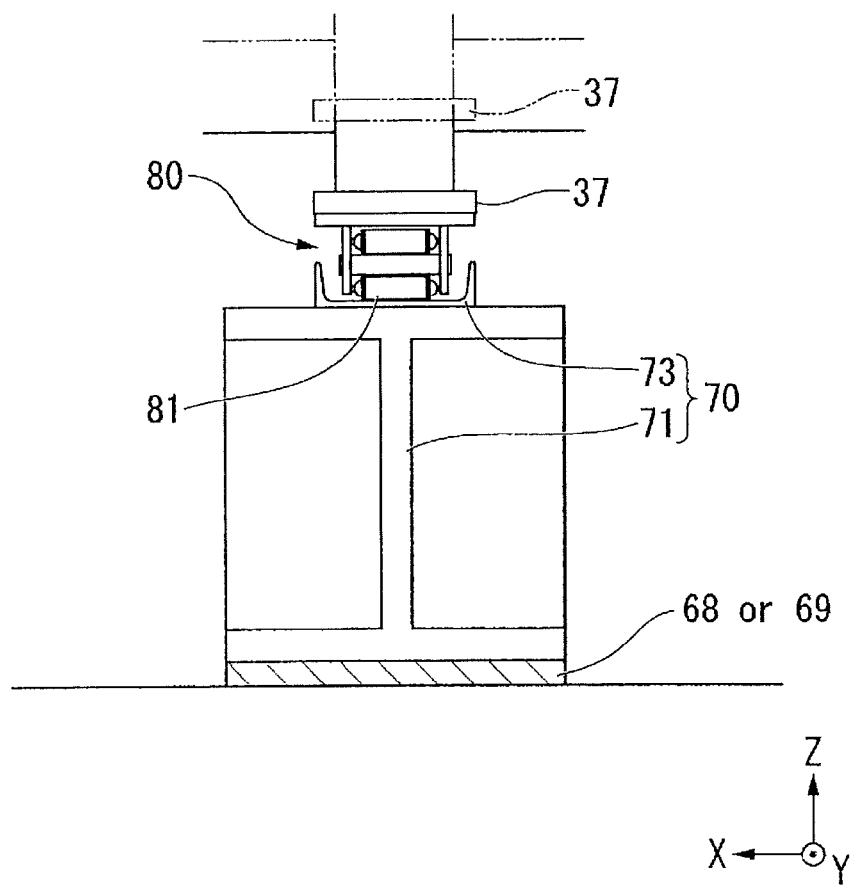
FIG. 16 is a detailed view of a section XVI-XVI in FIG. 15.
Figure 17:
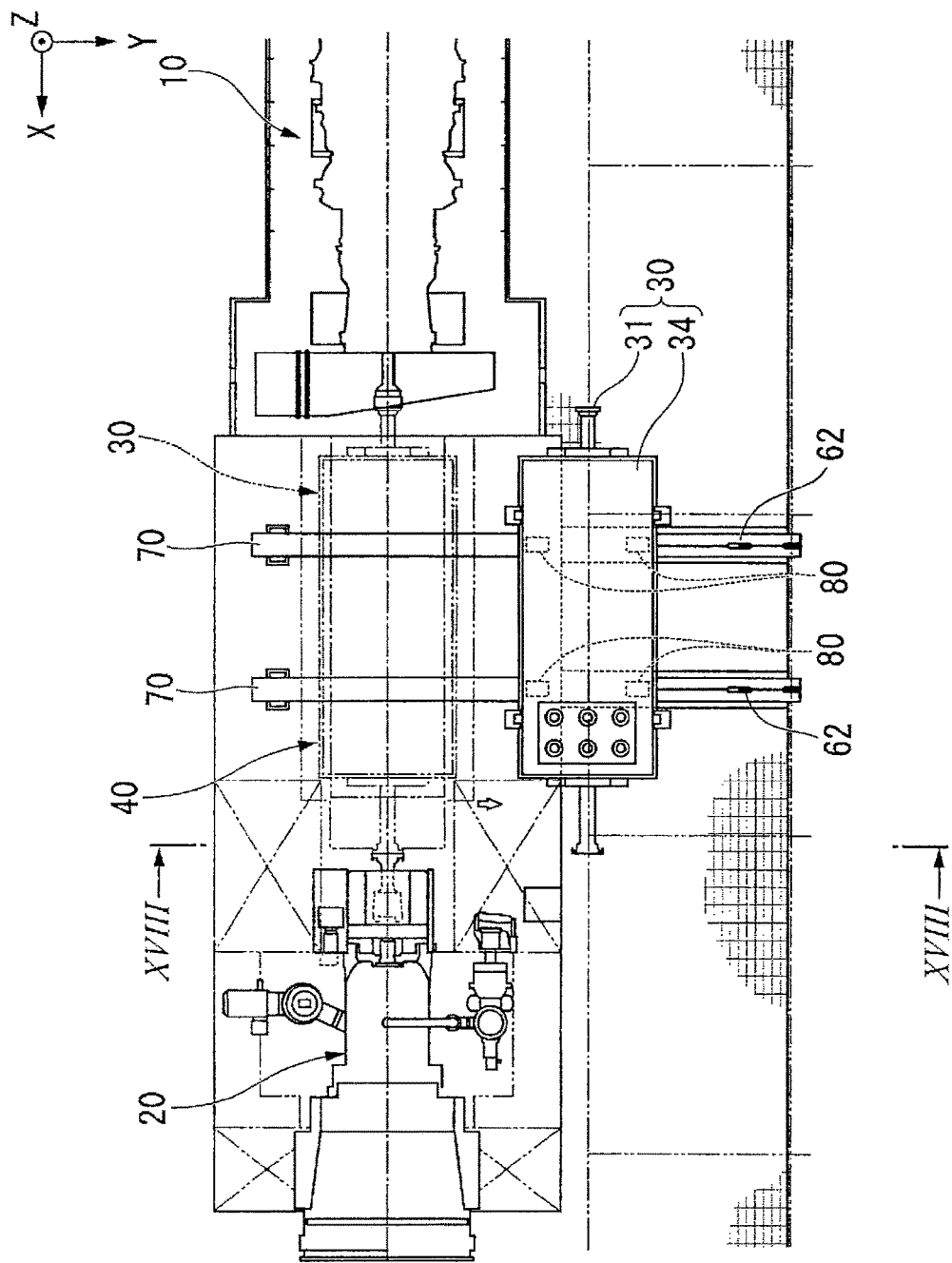
FIG. 17 is a plan view of the main portion of the combined cycle power generation plant during the moving step of the embodiment according to the present invention.

When the pathway installing step (step S4) is completed, as illustrated in FIGS. 11 to 13, the operator arranges a plurality of the roller carriages 80 on the movement pathway members 70 positioned below the generator 30 (step S5: a roller arranging step). As illustrated in FIG. 13 and FIG. 14, the roller carriage 80 has a plurality of cylindrical rollers 81, links 82 that connect the plurality of rollers 81 with each other in a ring shape so that central axes of the plurality of rollers 81 become parallel to each other, and a base 89 that rotatably supports a ring-shaped crawler configured by the plurality of rollers 81 connected by the links 82. The base 89 has a center guide 83 that regulates a track geometry of the ring-shaped crawler, a pair of side plates 84 that support the center guide 83 by sandwiching the center guide 83 therebetween in a direction in which the central axes of the rollers 81 extend, and a top plate (a placement portion) 85 which faces the center guide 83 and to which the pair of side plates 84 are fixed. In the roller arranging step (step S5), the operator arranges the plurality of roller carriages 80 on the roller guide rail 73 of the movement pathway member 70, as illustrated in FIG. 13.

As described above, the movement pathway members 70 and the roller carriages 80 are arranged between the generator 30 and the installation stand 40. Further, the movement pathway members 70 are installed, using the level adjustment members 68 and 69, at a position higher than an upper surface of the installation stand 40. In the above-described gap forming step (step S3), the gap is formed between the generator 30 and the installation stand 40 in order to arrange the movement pathway members 70 and the roller carriages 80 between the generator 30 and the installation stand 40. Therefore, a dimension of the gap is sufficient as long as the dimension is slightly larger than a dimension obtained by adding a height dimension of the level adjustment members 68 and 69 that are arranged on the installation stand 40, a height dimension of the movement pathway member 70, ad a height dimension of the roller carriage 80.

Figure 18:
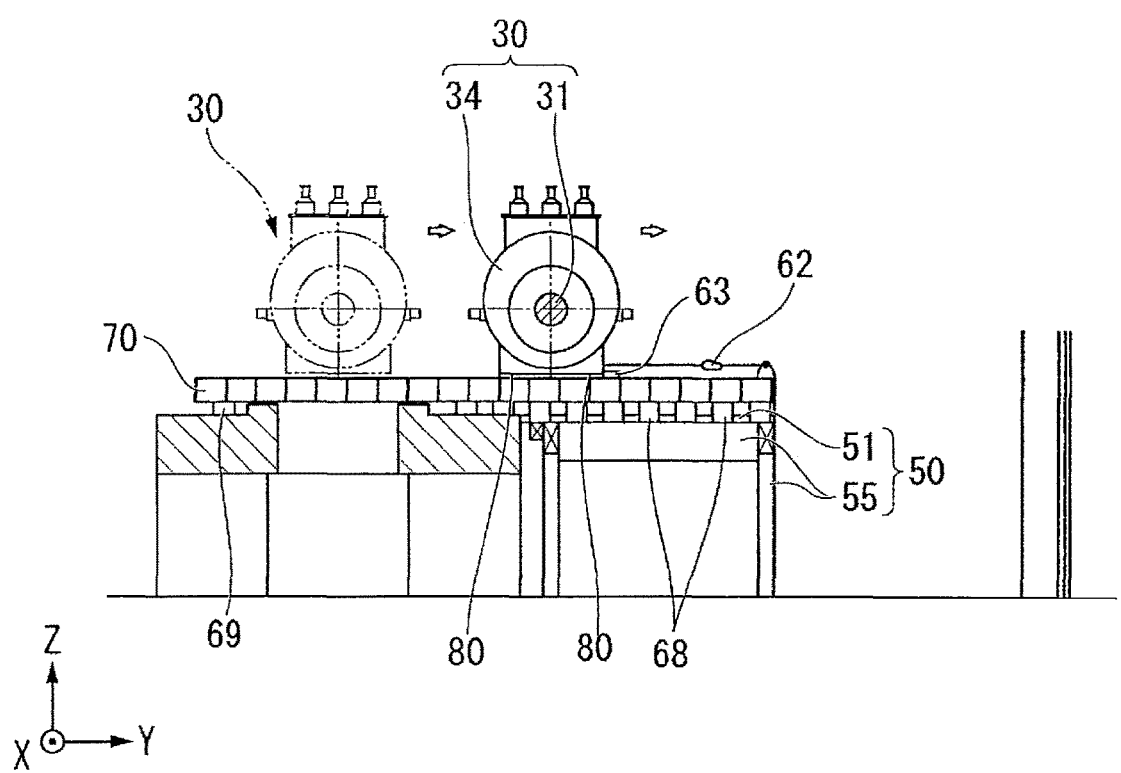
FIG. 18 is a cross-sectional view taken along a line XVIII-XVIII in FIG. 17.

When the roller arranging step (step S5) is completed, as illustrated in FIGS. 15 to 18, the operator places the generator 30 on the plurality of roller carriages 80, and then moves the generator 30 in the lateral direction along the roller guide rail 73 (step S6: a moving step). In the moving step (step S6), the operator firstly operates the jack 60 so as to lower the generator 30 and place the generator 30 on the plurality of rollers 81. Then, the operator removes the jack 60 from between the generator 30 and the installation stand 40. Next, as illustrated in FIG. 18, the operator attaches an end of a chain extending from a chain block 62 to an end portion on the (+) Y side of an upper part of the work stand 50, and also attaches an end of another chain extending from the chain block 62 to the generator 30. Then, the operator operates the chain block 62 so as to move the generator 30 in the lateral direction along the roller guide rail 73. At this time, as the generator 30 is placed on the roller carriages 80, a rolling friction arises between the generator 30 and the movement pathway members 70. As a result, the generator 30 can be easily moved in the lateral direction. When the generator 30 is moved in the lateral direction and reaches a position at which the shaft 31 does not interfere with the steam turbine 20 even when the shaft 31 is pulled out from the casing 34 of the generator 30 in the axial direction (the X-direction), a stopper 63 is arranged between the rollers 81 of the roller carriages 80 and the roller guide rail 73 so as to restrict a rolling of the rollers 81. Note that when the roller carriage 80 is provided with a stopper, the rolling of the rollers 81 may be restricted by operating the stopper.

Figure 19:
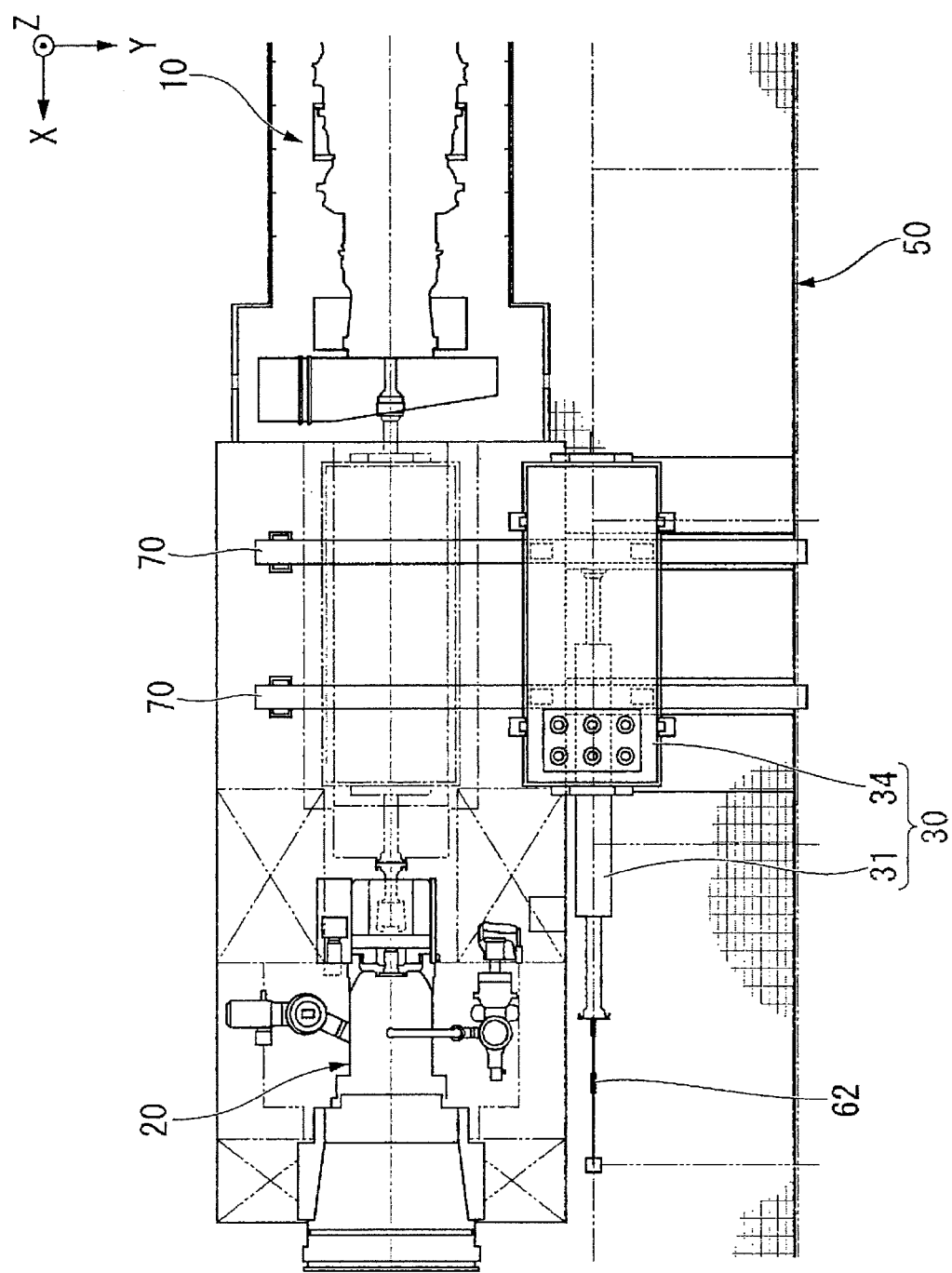
FIG. 19 is a plan view of the main portion of the combined cycle power generation plant during an inspecting step in the embodiment according to the present invention.
Figure 20:
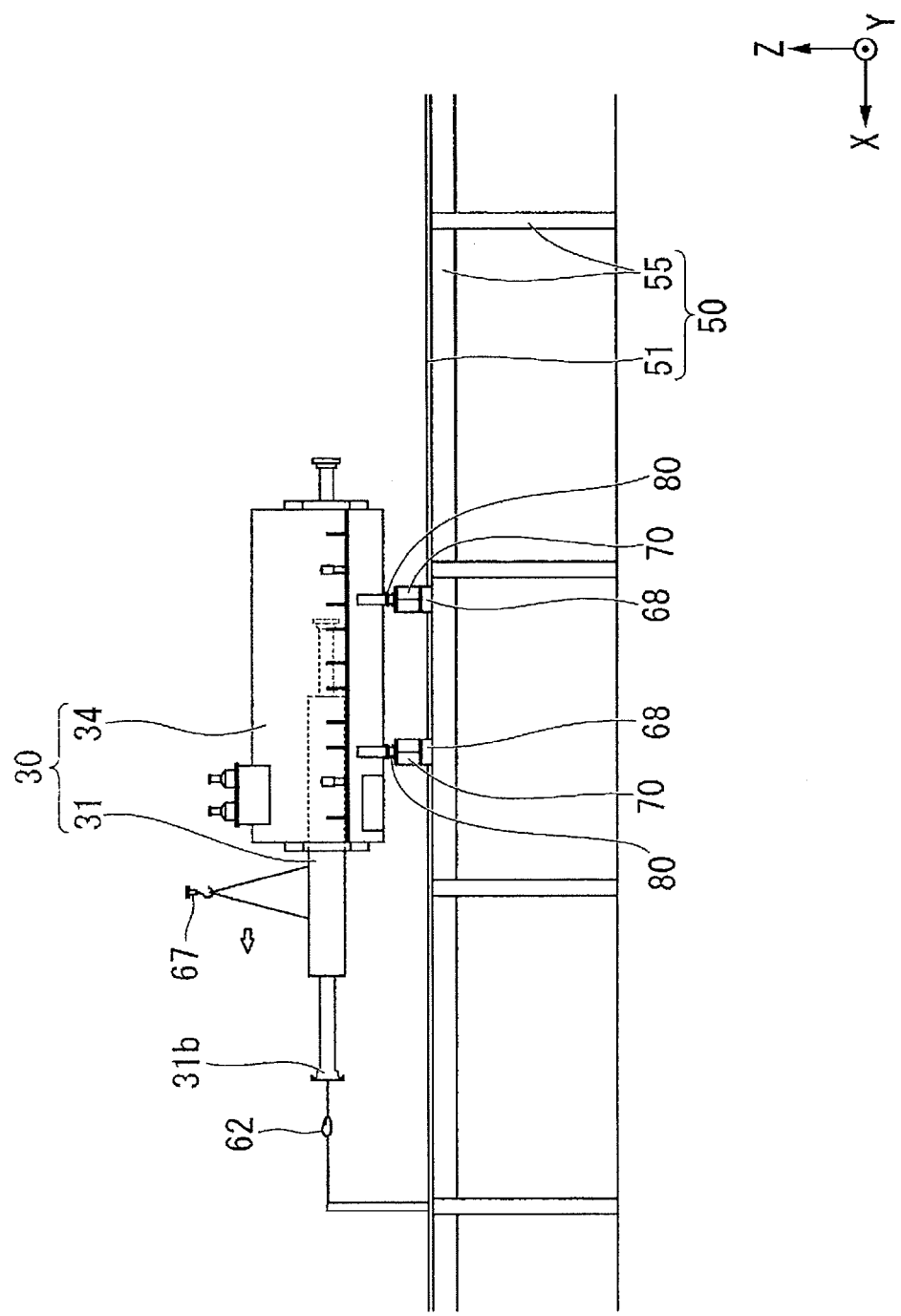
FIG. 20 is a side view of a generator and a work stand during the inspecting step of the embodiment according to the present invention.
Figure 21:
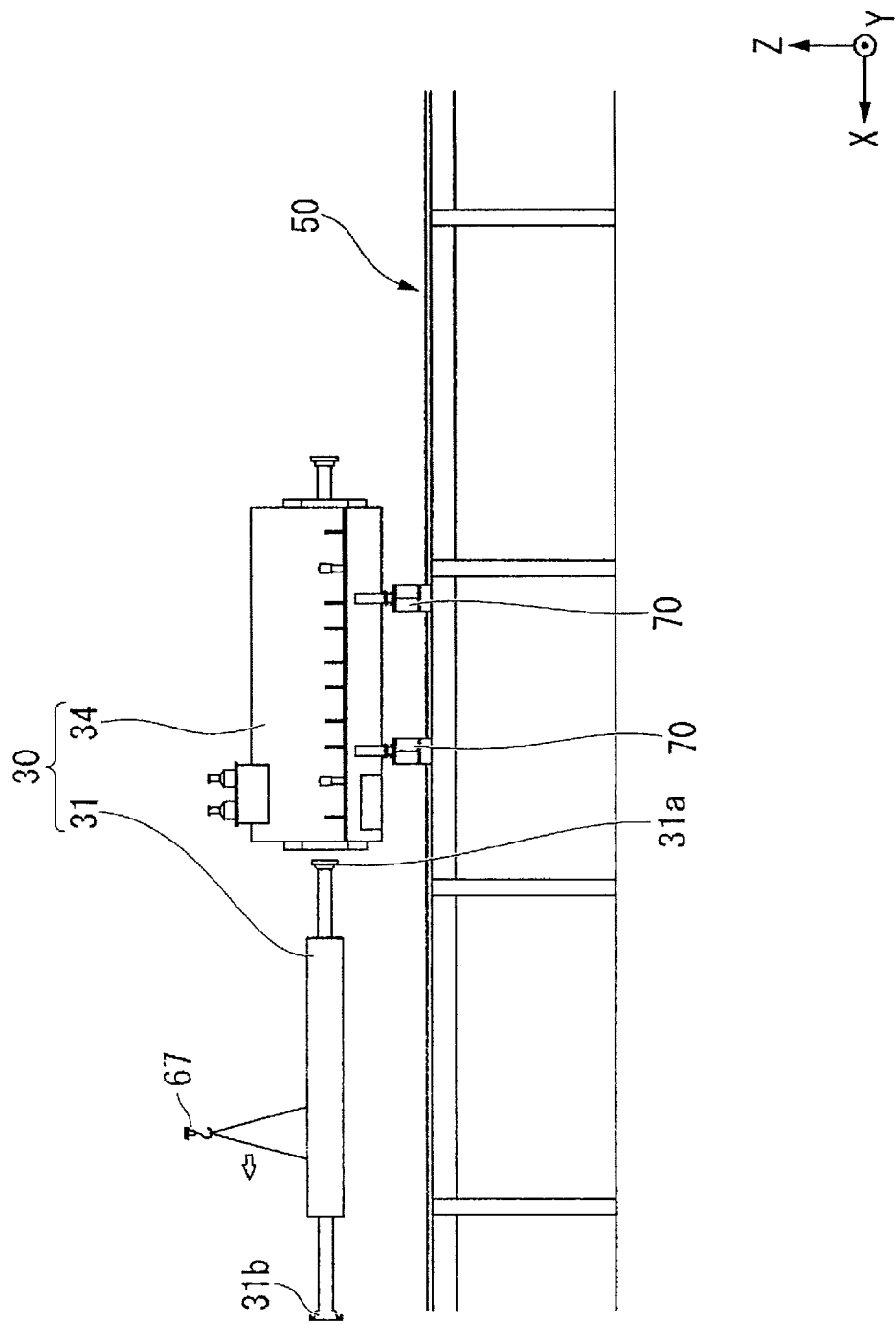
FIG. 21 is a side view of the generator and the work stand when an inspection is actually carried out in accordance with the inspecting step of the embodiment according to the present invention.

When the moving step (step S6) is completed, the operator inspects the generator 30 on the roller carriages 80 (step S7: an inspecting step). In the inspecting step (step S7), as illustrated in FIG. 19 and FIG. 20, an end of a chain extending from the chain block 62 is attached to a position in the work stand 50 on the (+) X-direction side of the generator 30, and also, an end of another chain extending from the chain block 62 is attached to the other end (the (+) X-direction side end) 3 1b of the shaft 31 on the (+) X side of the generator 30. Then, the operator operates the chain block 62 so as to start pulling out the shaft 31 of the generator 30 toward the axial direction side (the (+) X-direction side) of the shaft 31. When the shaft 31 of the generator 30 is exposed from the casing 34 of the generator 30 to some extent, the shaft 31 is suspended by the crane 67 or the like. As illustrated in FIG. 20 and FIG. 21, when the shaft 31 of the generator 30 is completely exposed from the casing 34 of the generator 30, the chain block 62 is removed from the shaft 31. At this time, the shaft 31 is in a state of being suspended by the crane 67 or the like. Then, the operator inspects the shaft 31 and the casing 34 from which the shaft 31 has been pulled out, and repairs the shaft 31 or the casing 34 as necessary. Note that in a process of inspecting and repairing the shaft 31, the shaft 31 may be placed on a shaft support as necessary. When the inspection or the like is completed, an end of a chain extending from the chain block is attached to a position in the work stand 50 on the (−) X-direction side of the generator 30, and also, an end of another chain extending from the chain block is attached to the one end (the (−) X-direction side end) 31a of the generator 30 via a wire or the like. Then, the operator operates the chain block 62 so as to start pulling the shaft 31 of the generator 30 toward the axial direction side (the (−) X-direction side) of the shaft 31. When the shaft 31 of the generator 30 is completely fitted into the casing 34, the inspecting step (step S7) is completed.

When the inspecting step (step S7) is completed, the operator returns the generator 30 onto an original installation position (step S8: a return moving step). In the return moving step (step S8), the operator attaches an end of a chain extending from the chain block to an end portion of the installation stand 40 positioned further to the (−) Y side than the installation position of the generator 30, and also attaches an end of another chain extending from the chain block to the generator 30. Then, after removing the stopper 63 that has been restricting the rolling of the roller carriages 80, the operator operates the chain block so as to move the generator 30 in the lateral direction (the (−) Y-direction along the roller guide rail 73. When this movement causes the generator 30 to reach the original installation position, the chain block is removed from the generator 30.

When the return moving step (step S8) is completed, the operator forms a gap between the roller carriages 80 on the movement pathway members 70 and the generator 30 in the vertical direction (the Z-direction) (step S9: a gap forming step). In the gap forming step (step S9), the operator sets the jack 60 between the first load receiving seat 36 of the generator 30 and the installation stand 40, and lifts up the generator 30 by operating the jack 60, in the same manner as in the case described with reference to FIG. 6 and the like.

When the gap forming step (step S9) is completed, the operator removes the plurality of roller carriages 80 from between the movement pathway members 70 and the generator 30 (step S10: a roller removing step).

When the roller removing step (step S 10) is completed, the operator removes the movement pathway members 70 from between the installation stand 40 and the generator 30 (step S11: a pathway removing step). In the pathway removing step (step S11), the operator pulls out the movement pathway members 70 from between the installation stand 40 and the generator 30 by suspending the movement pathway members 70 by the crane or the like and moving the movement pathway members 70 toward the (+) Y side. Next, the level adjustment members 68 on the work stand 50 and the level adjustment members 69 on the installation stand 40 are removed. Then, the cutouts 52 of the floor board 51 of the work stand 50 are closed by the lid boards 53 (illustrated in FIG. 2).

When the pathway removing step (step S11) is completed, the operator places the generator 30 at the original installation position (step S12: a generator placing step). In the generator placing step (step S12), the operator operates the jack 60 so as to lower the generator 30 and place the generator 30 at the original installation position. Then, the operator fixes the generator 30 to the installation stand 40 using the installation bolts or the like, while performing centering of the shaft 31 of the generator 30, the shaft 11 of the gas turbine 10, and the shaft 21 of the steam turbine 20 in order to align them with each other.

When the generator placing step (step S12) is completed, the operator connects the shaft 11 of the gas turbine 10 with the shaft 31 of the generator 30, and also connects the shaft 31 of the generator 30 with the shaft 21 of the steam turbine 20 (step S13: a shaft connecting step). When the shaft connecting step (step S13) is completed, the operator attaches the above-described movement interfering objects to the generator 30, the gas turbine 10, and the like (step S14: a movement interfering object attaching step).

As a result of the above, all the steps for the inspection of the generator 30 are completed.

As described above, in the present embodiment, as the generator 30 is moved in the lateral direction before being inspected, it is not necessary to disassemble the gas turbine 10 or the steam turbine 20 when disassembling the generator 30. Note that the disassembly here refers to disassembly including removal of a shaft.

Further, in the present embodiment, although it is necessary to prepare the movement pathway members 70 and the roller carriages 80 in advance in order to inspect the generator 30, there is no need to prepare two large platforms. Furthermore, in a process of carrying out the inspection in the present embodiment, although it is necessary to lift up the generator 30, the generator 30 can be lifted up by the generally-available jack 60, and there is no need to lift up the generator 30 to a position higher than the highest point of the steam turbine 20 using a special lift-up device. Thus, according to the present embodiment, inspection costs of the generator 30 can be minimized.

Further, in the present embodiment, the generator 30 is inspected on the work stand 50 that has substantially the same upper surface level as the upper surface level of the installation stand 40. Thus, it is possible to almost completely eliminate high-place work when inspecting the generator 30.

Furthermore, in the present embodiment, a portion of the floor board 51 of the work stand 50 is cut out in advance, and the movement pathway members 70 are installed on the support structure 55 of the work stand 50 that is exposed from the cutouts 52. Thus, the installation locations of the movement pathway members 70 can be easily identified, and also, the movement pathway members 70 can be supported in a stable manner because the movement pathway members 70 are directly supported by the support structure 55 having a high rigidity.

MODIFIED EXAMPLE

A modified example of the above-described embodiment will be described below.

In the above-described embodiment, in which the Y-direction that is the horizontal direction is defined as the lateral direction, the movement pathway members 70 extend in the lateral direction. However, the lateral direction does not have to be a strictly horizontal direction, but may be slightly inclined with respect to the horizontal direction. Specifically, the lateral direction may be slightly inclined with respect to the horizontal direction, or may be slightly inclined with respect to a radial direction of the shaft 31 of the generator 30, as long as the lateral direction is a direction that includes a horizontal direction component and a radial direction component of the shaft 31 of the generator 30.

In the above-described embodiment, although two of the movement pathway members 70 extending in the lateral direction are arranged side by side in the axial direction (the X-direction), the number of the movement pathway members 70 may be one, or three or more. However, when the number of the movement pathway members 70 is one, it is preferable that the movement pathway member 70 has a wide width in the X-direction.

In the above-described embodiment, the roller carriages 80 are arranged between the generator 30 and the movement pathway members 70. However, the plurality of rollers 81 may simply be arranged in place of the roller carriages 80. Alternatively, an air bearing, which is called an air skate or the like, may be arranged. Furthermore, by forming an upper surface of the movement pathway member 70 by a metal having a small friction coefficient, the generator 30 may be moved by sliding it on the movement pathway member 70.

Although the cutouts 52 are formed in advance in the floor board 51 of the work stand 50 in the above-described embodiment, the cutouts 52 need not necessarily be provided. Further, in the above-described embodiment, the movement pathway members 70 are laid across the installation stand 40 of the generator 30 and the work stand 50, which support the movement pathway members 70. However, instead of the work stand 50, the movement pathway members 70 may be supported by other structures. For example, when the installation stand also extends in the lateral direction of the generator 30, a portion of the installation stand may be used as a structure.

Although the movement pathway members 70 and the shaft 31 of the generator 30 are moved using the chain block 62 in the above-described embodiment, the movement pathway members 70 and the shaft 31 of the generator 30 may be moved using another device such as a hoist.

In the above-described embodiment, of the (+) Y side and the (−) Y side of the Y-direction (the lateral direction), the generator 30 is moved toward the (+) Y-direction. However, whether the generator 30 is moved toward the (+) Y side or toward the (−) Y side depends on a layout inside the combined cycle power generation plant. Thus, depending on the layout inside the combined cycle power generation plant, the generator 30 may be moved toward the (−) Y side.

INDUSTRIAL APPLICABILITY

According to one aspect of the present invention, inspection costs of a generator can be minimized.

REFERENCE SIGNS LIST

10 Gas turbine (rotary machine)
11 Shaft
14 Casing
19 Exhaust heat recovery boiler
20 Steam turbine (rotary machine)
21 Shaft
24 Casing
25 Condenser
30 Generator
31 Shaft
34 Casing
40 Installation stand
50 Work stand
51 Floor board
52 Cutout
53 Lid board
55 Support structure
60 Jack
62 Chain block
63 Stopper
68, 69 Level adjustment member
70 Movement pathway member
71 Support beam
73 Roller guide rail (roller guide member)
80 Roller carriage
81 Roller
89 Base

The invention claimed is:

1. A generator inspection method of inspecting a generator in which rotary machines are respectively connected to both ends of a shaft, the method comprising:
a shaft disconnecting step of disconnecting the rotary machines respectively connected to the ends of the shaft;
a gap forming step of forming a gap, in a vertical direction, between an installation stand of the generator and the generator;
a pathway installing step of inserting into the gap a portion of a movement pathway member extending in a lateral direction, the lateral direction including a horizontal direction component and a radial direction component of the shaft;
a moving step of moving the generator in the lateral direction on the movement pathway member; and
an inspecting step of inspecting the generator having undergone the moving step.

2. The generator inspection method according to claim 1, wherein
following the gap forming step and before the moving step, a roller arranging step is carried out to arrange a roller, which rolls in the lateral direction, between the movement pathway member and the generator.

3. The generator inspection method according to claim 2, wherein
in the roller arranging step, a roller carriage is arranged, the roller carriage being provided with at least one roller and a base which has a placement portion, on which an object is placed, above the at least one roller and which rotatably supports the at least one roller.

4. The generator inspection method according to claim 2, wherein
the movement pathway member has a roller guide member that regulates a movement of the roller in a horizontal direction perpendicular to the lateral direction.

5. The generator inspection method according claim 2, wherein
in the moving step, a rolling of the roller is restricted after moving the generator to an intended position in the lateral direction.

6. The generator inspection method according to claim 1, wherein
in the gap forming step, the generator is lifted upward using a jack, and a gap is formed in the vertical direction between the installation stand of the generator and the generator.

7. The generator inspection method according to claim 1, wherein
a structure that supports the movement pathway member is installed in advance at a position in the lateral direction of the generator, and
in the pathway installing step, the portion of the movement pathway member is inserted into the gap and then the movement pathway member is placed on the installation stand and the structure.

8. The generator inspection method according to claim 7, wherein
the structure has a floor board and a support structure that supports the floor board from below, and
a portion of the floor board is cut out along a section on which the movement pathway member is placed above the support structure.

9. The generator inspection method according to claim 8, wherein
the structure has a lid board that closes the cutout section of the floor board.

10. The generator inspection method according to claim 1, wherein
in the inspecting step, the shaft is pulled out, in an axial direction, from a casing that covers the shaft.

11. The generator inspection method according to claim 1, wherein,
after the inspecting step, the following steps are carried out:
a return moving step of returning the generator to an original position thereof above the installation stand in the horizontal direction by moving the generator in the lateral direction on the movement pathway member;
a gap forming step of forming a gap in the vertical direction between the movement pathway member and the generator;
a pathway removing step of removing the movement pathway member;
a placing step of placing the generator on the installation stand; and
a shaft connecting step of connecting the rotary machines respectively to the ends of the shaft.

* * * * *